United States Patent
Ishizaki et al.

(10) Patent No.: US 11,634,805 B2
(45) Date of Patent: Apr. 25, 2023

(54) AUSTENITIC STAINLESS STEEL AND REACTOR INTERNAL STRUCTURE

(71) Applicant: Hitachi, Ltd., Tokyo (JP)

(72) Inventors: Takahiro Ishizaki, Tokyo (JP); Yusaku Maruno, Tokyo (JP); Kinya Aota, Tokyo (JP); Yingjuan Yang, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 17/058,250

(22) PCT Filed: Mar. 11, 2019

(86) PCT No.: PCT/JP2019/009613
§ 371 (c)(1),
(2) Date: Nov. 24, 2020

(87) PCT Pub. No.: WO2019/235014
PCT Pub. Date: Dec. 12, 2019

(65) Prior Publication Data
US 2021/0189537 A1    Jun. 24, 2021

(30) Foreign Application Priority Data
Jun. 6, 2018  (JP) .............................. JP2018-108244

(51) Int. Cl.
*C22C 38/58*  (2006.01)
*C22C 38/02*  (2006.01)
(Continued)

(52) U.S. Cl.
CPC .............. *C22C 38/58* (2013.01); *C21D 6/004* (2013.01); *C21D 6/005* (2013.01); *C21D 6/008* (2013.01);
(Continued)

(58) Field of Classification Search
CPC ...... B22F 3/105; B22F 3/16; C21D 2211/001; C21D 2211/005; C21D 6/004;
(Continued)

(56) References Cited

U.S. PATENT DOCUMENTS

2018/0274053 A1  9/2018  Ishizaki et al.
2018/0281062 A1  10/2018  Cha et al.

FOREIGN PATENT DOCUMENTS

JP  62-197247 A   8/1987
JP  8-337853 A   12/1996
(Continued)

OTHER PUBLICATIONS

International Search Report (PCT/ISA/210) issued in PCT Application No. PCT/JP2019/009613 dated May 28, 2019 with English translation (four (4) pages).
(Continued)

*Primary Examiner* — Anthony M Liang
(74) *Attorney, Agent, or Firm* — Crowell & Moring LLP

(57) ABSTRACT

An austenitic stainless steel includes a mixed grain structure composed of a columnar crystal having an average crystal grain size of 20 μm or less and an equiaxed crystal having an average crystal grain size of 5.0 μm or less, in which an area proportion of the columnar crystal in the mixed grain structure is 20% or more, and an average crystal grain size of the whole mixed grain structure is 5.0 μm or less. Accordingly, it is possible to provide a material having excellent irradiation resistance and mechanical properties.

8 Claims, 8 Drawing Sheets

(51) Int. Cl.
*C22C 38/44* (2006.01)
*C22C 38/48* (2006.01)
*C22C 38/50* (2006.01)
*C21D 6/00* (2006.01)

(52) U.S. Cl.
CPC .............. *C22C 38/02* (2013.01); *C22C 38/44* (2013.01); *C22C 38/48* (2013.01); *C22C 38/50* (2013.01); *C21D 2211/001* (2013.01); *C21D 2211/005* (2013.01)

(58) Field of Classification Search
CPC ........ C21D 6/005; C21D 6/008; C22C 38/00; C22C 38/02; C22C 38/44; C22C 38/48; C22C 38/50; C22C 38/58; G21C 5/00; G21C 7/10; G21D 1/00
See application file for complete search history.

(56) References Cited

FOREIGN PATENT DOCUMENTS

| | | |
|---|---|---|
| JP | 2001-347349 A | 12/2001 |
| JP | 2002-285289 A | 10/2002 |
| WO | WO 2017/057838 A1 | 4/2017 |
| WO | WO 2017/073422 A1 | 5/2017 |
| WO | WO 2019/064641 A1 | 4/2019 |
| WO | WO-2019114874 A1 * | 6/2019 |

OTHER PUBLICATIONS

Japanese-language Written Opinion (PCT/ISA/237) issued in PCT Application No. PCT/JP2019/009613 dated May 28, 2019 (five (5) pages).

* cited by examiner

[FIG. 1]
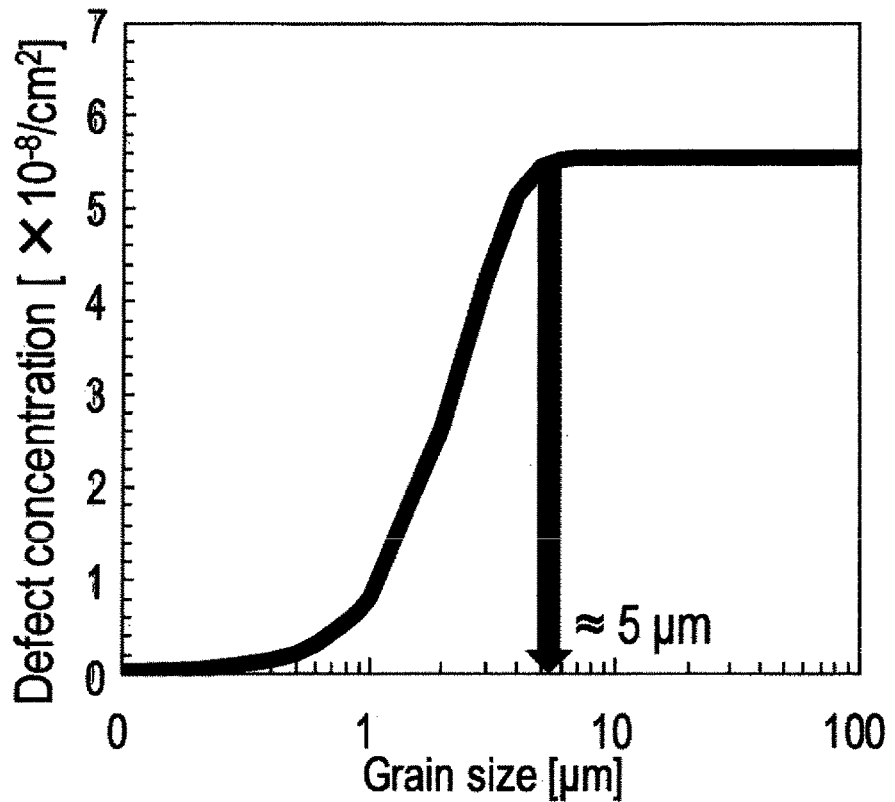
[FIG. 2]
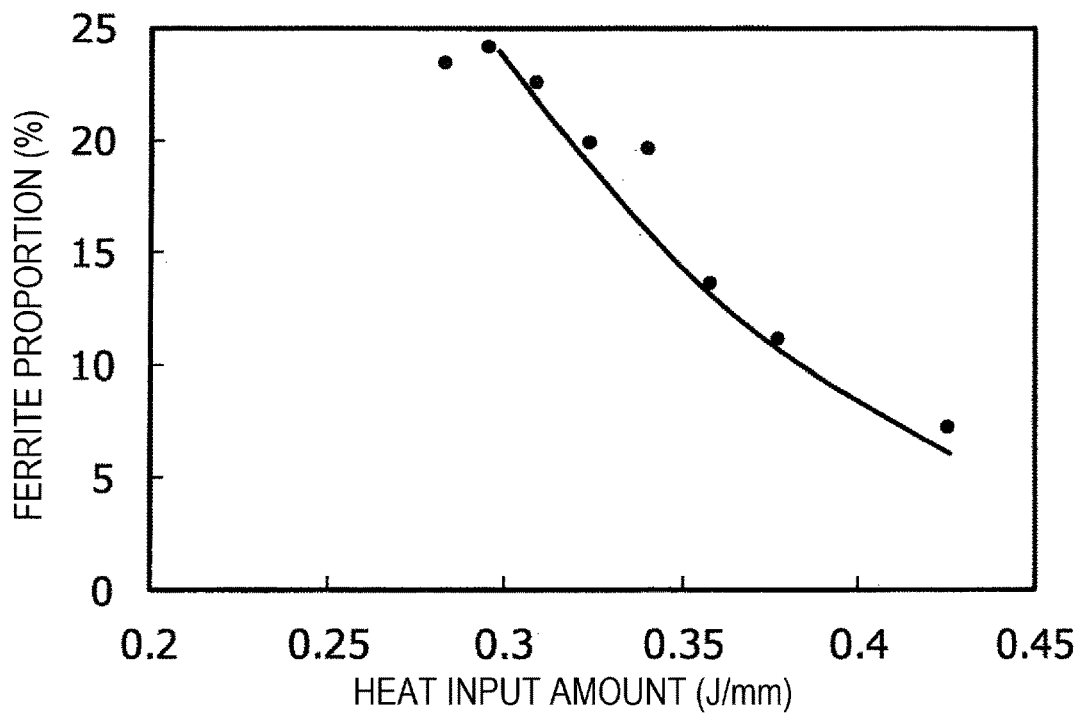

[FIG. 3]
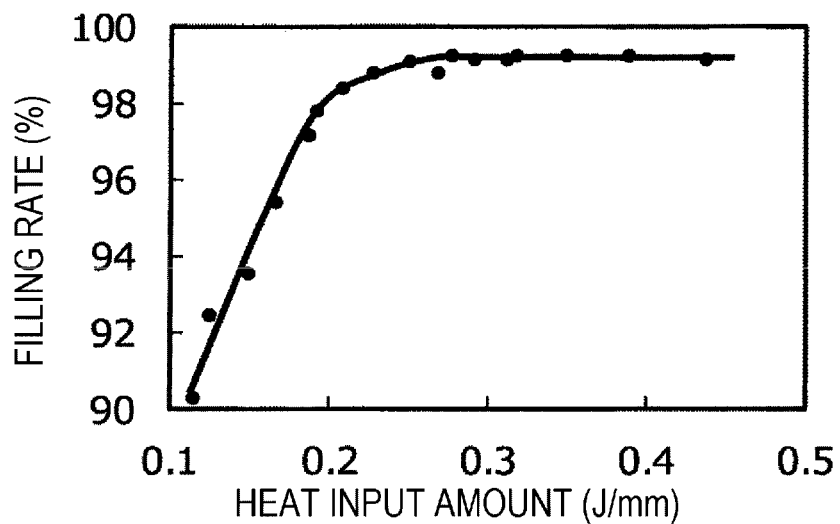
[FIG. 4]
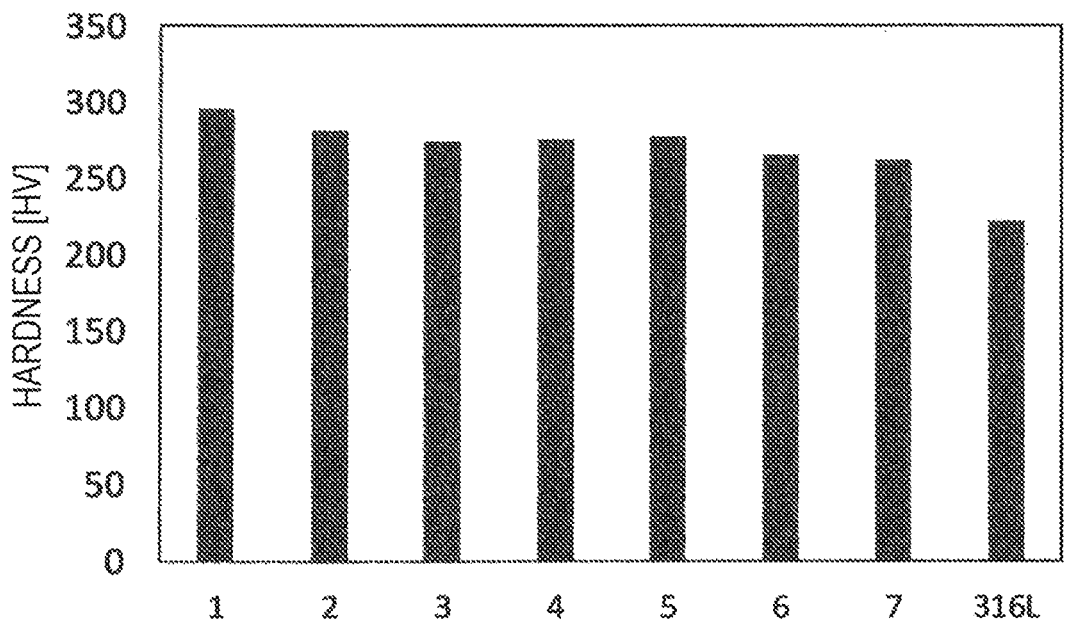

[FIG. 5]
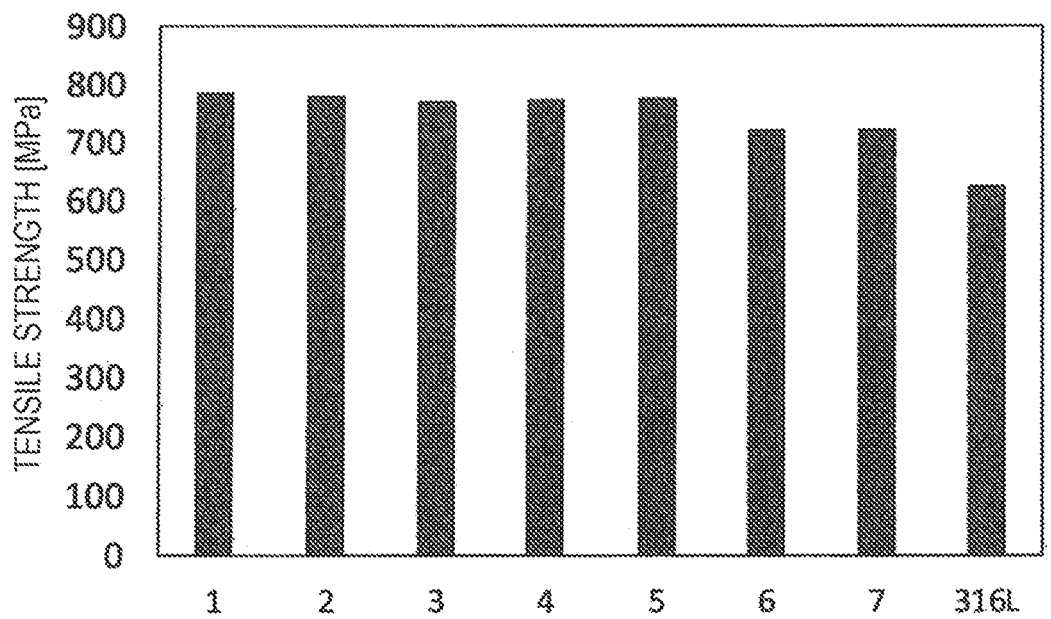

FIG. 6A
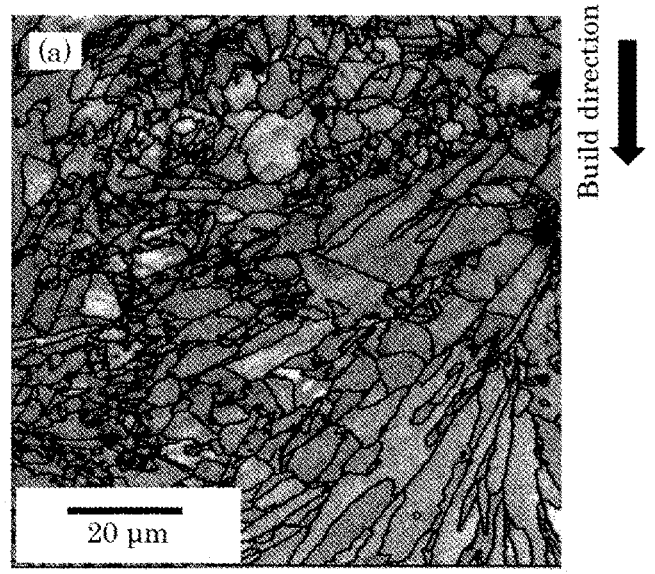
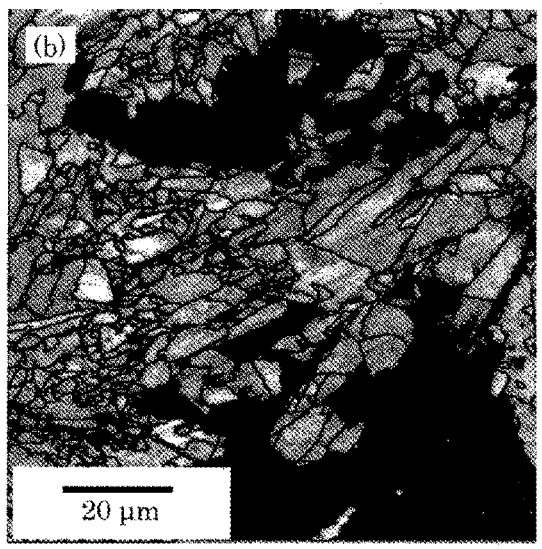
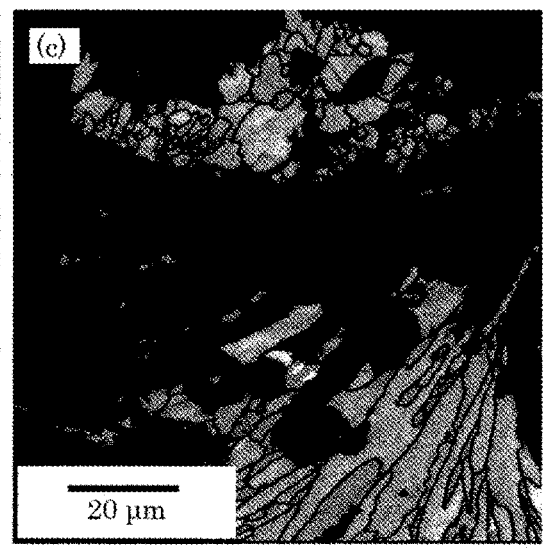
FIG. 6B  FIG. 6C

[FIG. 7]
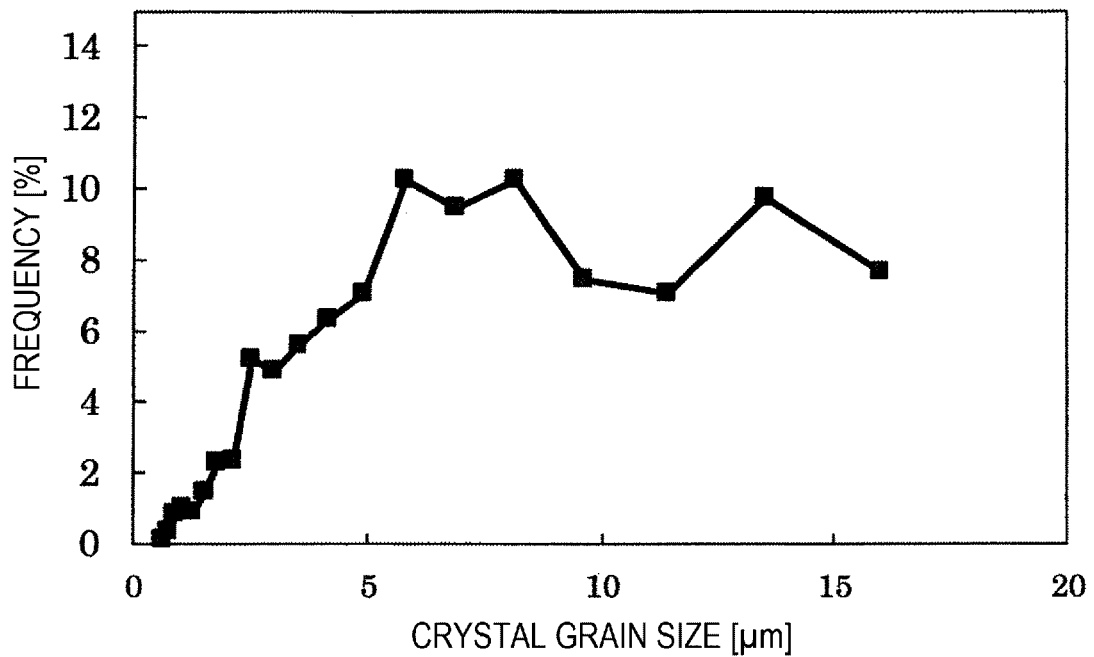
[FIG. 8]
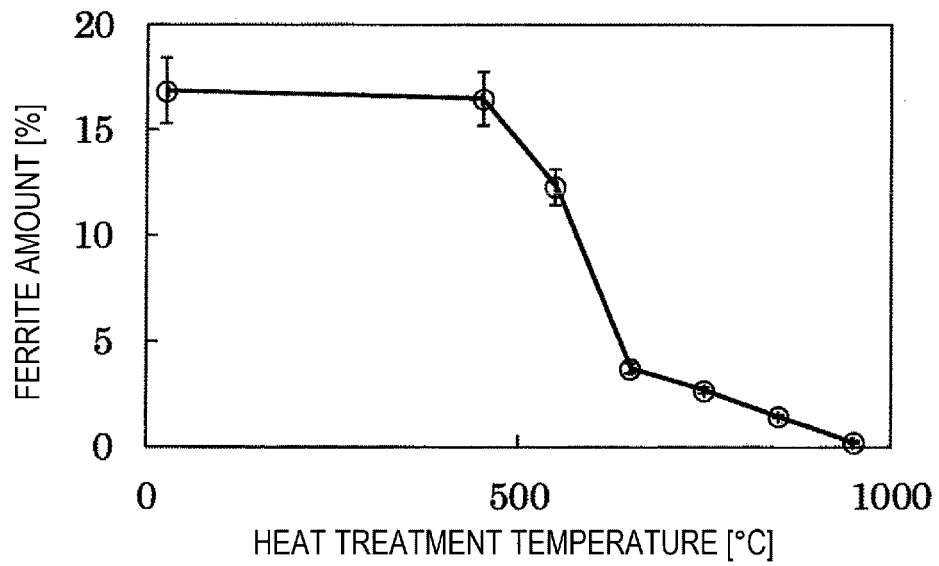

[FIG. 9]
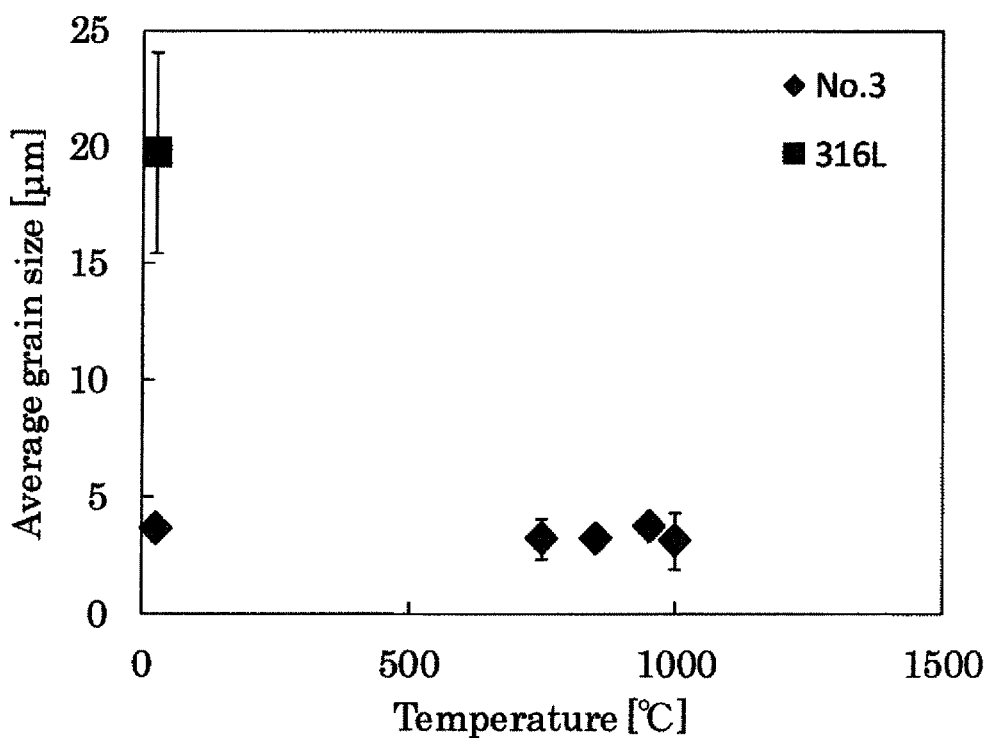

[FIG. 10]
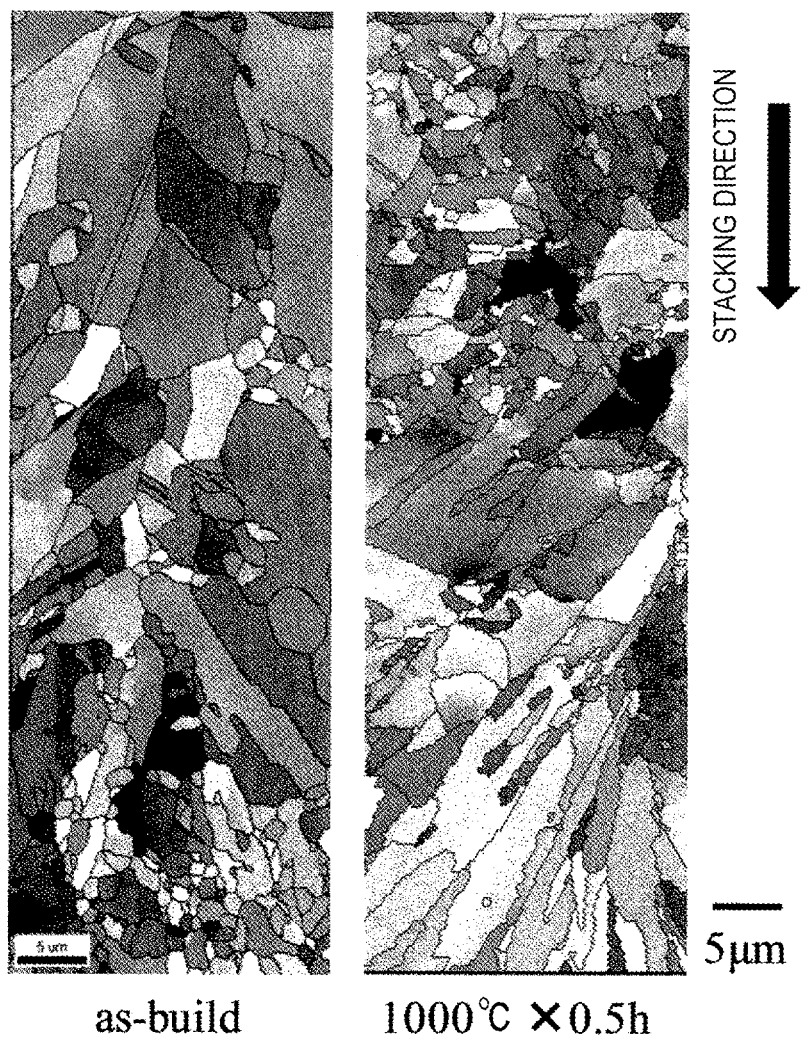
as-build     1000°C ×0.5h

[FIG. 11]
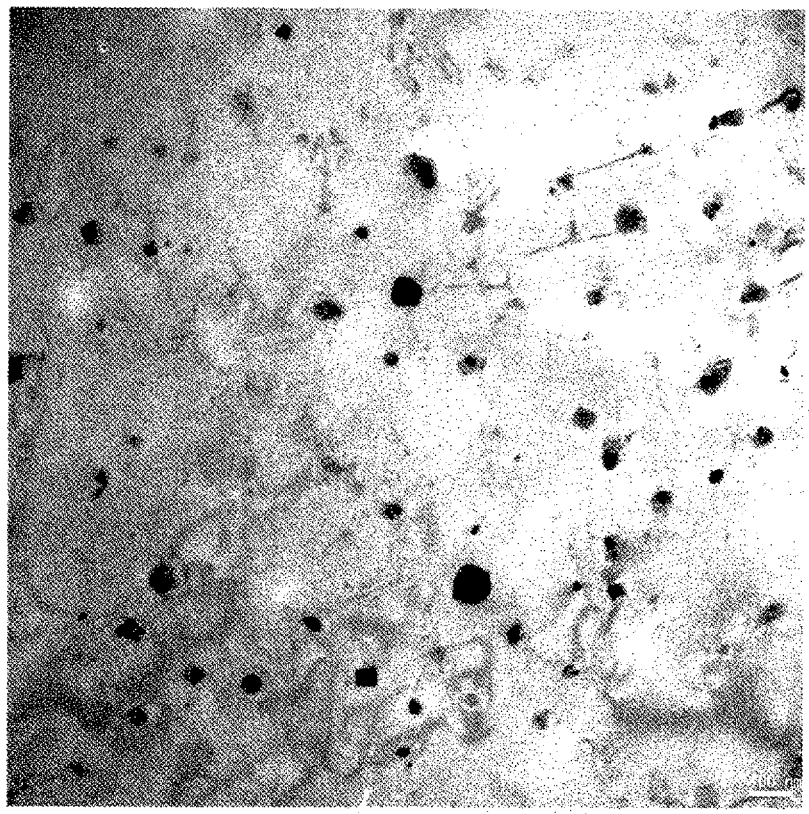
[FIG. 12]
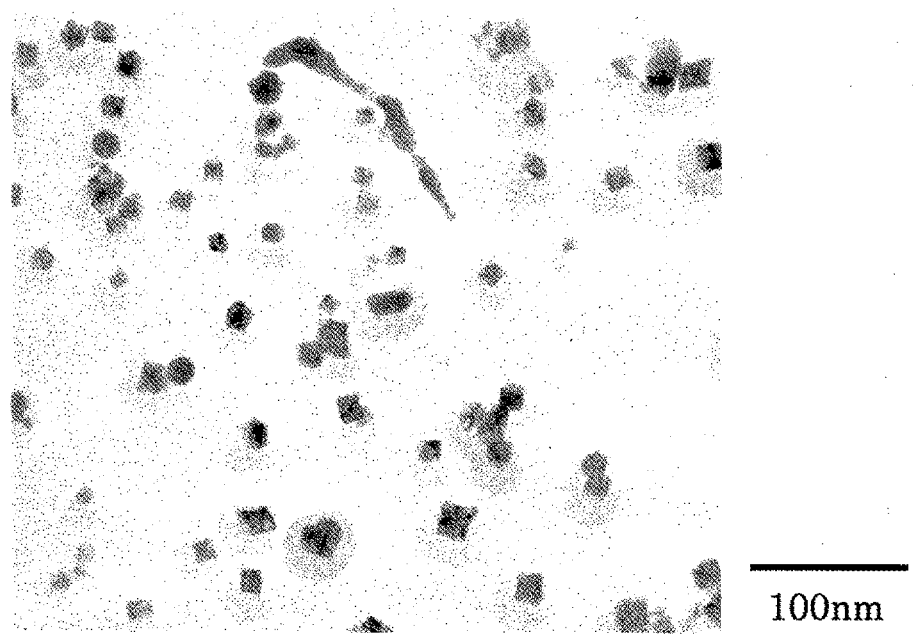
100nm

AUSTENITIC STAINLESS STEEL AND REACTOR INTERNAL STRUCTURE

TECHNICAL FIELD

The present invention relates to a material suitable for application to a control rod for a reactor, particularly a boiler water type light water reactor.

BACKGROUND ART

An austenitic stainless steel has high corrosion resistance in a corrosive environment by forming a Cr passivation film on a surface thereof, and therefore, is widely used as a component of a structural material. In a nuclear power plant, the austenitic stainless steel is used for a core shroud, a recirculation pipe and the like. However, in a high-temperature high-pressure water environment such as a reactor, stress corrosion cracking develops, the austenitic stainless steel is further exposed to neutron irradiation in the reactor, and an irradiation defect is introduced. Accordingly, it is pointed out that Cr deficiency may occur at crystal grain boundaries and that irradiation-induced stress corrosion cracking may develop. Therefore, in order to reduce the sensitivity to the irradiation-induced stress corrosion cracking, it is required to develop a material having excellent irradiation resistance and stress corrosion cracking resistance.

As a method for increasing the irradiation resistance to address the above problem, material development in which a crystal grain size is refined and a precipitation phase is introduced is active.

The refinement of the crystal grain size is widely studied as a method for improving a mechanical property of a metal material, and it is known that a material having an excellent mechanical property can be obtained by adjusting the crystal grain size to several μm or less, particularly 1 μm or less. PTLs 1 and 2 describe methods in which a stainless steel is subjected to intensive working such as mechanical alloying, a powder having an ultrafine grain structure is solidified and molded, and the powder is bulked out while maintaining the structure to secure a high strength and toughness. In the methods, a fine precipitation phase on an order of several tens of nm is dispersed at a high density so as to have a function as a pinning site for preventing coarsening of a crystal grain. The inventions can obtain an extremely fine structure, but the inventions have many problems in terms of material manufacturability and workability.

A shape produced by a process of solidifying and molding the powder is limited, only a limited shape such as a round bar shape, a flat plate shape, and a circular tube shape can be obtained, so that post-processing is essential to obtain a desired shape. However, due to the high strength of the material, poor workability, long-term manufacturing process, and increased manufacturing cost are caused, and the methods are not put to practical use currently.

As another method (in the related art) for obtaining a fine crystal grain, a crystal grain refining method using a rapid solidification process is provided. Since the method is performed by rapidly solidifying a molten steel, the method has an advantage of being excellent in the manufacturability and the workability as compared with the methods of PTLs 1 and 2. In the rapid solidification process, it is considered that a Ti nitride phase is generated in the molten steel in a process of melting and solidifying a metal material, and the solidification structure becomes finer by using the Ti nitride phase as a solidification nucleus.

The nitride of the precipitation phase formed by the method has a maximum size of more than 1.0 μm, and there is a concern that the size may be a factor that deteriorates the mechanical property, particularly the toughness. Further, when the austenitic stainless steel is rapidly solidified, a δ ferrite phase is generated. The δ ferrite phase has excellent strength property as compared with an austenite phase, but has low ductility and becomes a factor that reduces the toughness of the whole material. The δ-ferrite is restored to austenite by a heat treatment at 950° C. or more, and thus although the heat treatment is widely performed, it may cause the occurrence of coarsening of a crystal grain in this case. This is because the grain size of the nitride, which is the precipitation phase, is large, and therefore the nitride does not exhibit a sufficient effect as a pinning site.

CITATION LIST

Patent Literature

PTL 1: JP-A-8-337853
PTL 2: JP-A-2002-285289

SUMMARY OF INVENTION

Technical Problem

An object of the invention is to provide a material having excellent irradiation resistance and mechanical properties.

Solution to Problem

An austenitic stainless steel includes a mixed grain structure composed of a columnar crystal having an average crystal grain size of 20 μm or less and an equiaxed crystal having an average crystal grain size of 5.0 μm or less, in which an area proportion of the columnar crystal in the mixed grain structure is 20% or more, and an average crystal grain size of the whole mixed grain structure is 5.0 μm or less.

Advantageous Effect

According to the invention, it is possible to provide a material having excellent irradiation resistance and mechanical properties.

BRIEF DESCRIPTION OF DRAWINGS

FIG. 1 shows a relationship between a crystal grain size and an irradiation defect concentration.
FIG. 2 shows a relationship between a heat input amount and a ferrite proportion.
FIG. 3 shows a relationship between a heat input amount and a filling rate.
FIG. 4 shows a hardness measurement result of each test piece.
FIG. 5 shows a tensile test result of each test piece.
FIGS. 6A-6C show an EBSD observation result of No. 3 test piece.
FIG. 7 shows a crystal grain size distribution of No. 3 test piece.
FIG. 8 shows a relationship between a heat treatment temperature and a ferrite amount of No. 3 test piece.
FIG. 9 shows relationships between heat treatment temperatures and average crystal grain sizes of No. 3 test piece and a commercially available material.

FIG. 10 shows a structure comparison of No. 3 test piece before and after a heat treatment.

FIG. 11 shows a TEM observation result of No. 3 test piece.

FIG. 12 shows a TEM observation result of an extracted replica sample of No. 3 test piece.

DESCRIPTION OF EMBODIMENTS

A dispersion-strengthened austenitic stainless steel according to the present embodiment has the following composition by weight ratio. The stainless steel contains Cr: 16 to 26%, Ni: 3.5 to 26%, Si: 0.1 to 1.0%, Mo: 0.01 to 7.0%, Mn: 0.1 to 2.5%, C: 0.01 to 0.08%, O: 0.01 to 0.5%, N: 0.01 to 0.25%, and additional elements, and the balance is Fe and inevitable impurities. The additional element is one or more of Zr, Ti, Ta, and Hf. When all of these additional elements are contained, it is desirable that Zr is 0.1 to 2.8%, Ti is 0.1 to 2.6%, Ta is 0.2 to 5.0%, and Hf is 0.1 to 4.7%. The additional element and impurity elements form a precipitation phase. In other words, the additional element is a main component of the precipitation phase.

In order to refine a crystal grain, the austenitic stainless steel having the above composition is rapidly melted and rapidly solidified. In a process of rapid melting and rapid solidification, the additional element contributes to the refinement of the crystal grain by combining with the impurity elements such as O, C, and N to form a precipitation phase, highly purify the parent phase, and become a nucleu of a solidification structure.

As a method for rapidly melting and rapidly solidifying a metal material, it is necessary to locally apply high energy such as an electron beam or a laser. At this time, if a volume to be melted is large, a sufficient melting rate and solidification rate cannot be obtained, and thus the volume to be melted needs to be made small. In a specific method, a thin steel plate or an alloy powder having a thickness of 1 mm or less, preferably 100 µm or less is spread over a certain region, and high energy is applied by an electron beam or a laser to locally melt and solidify. After melting and solidifying all of a target region, the steel plate and the alloy powder are spread again, and the high energy is applied using the electron beam or the laser. By repeating the process, a bulk material can be obtained. At this time, the melting rate and a cooling rate are preferably $1.0 \times 10^3$ [° C./sec] or more.

When the crystal grain size is made fine, a large amount of crystal grain boundaries that are irradiation defect extinction sites are introduced, so that an irradiation defect concentration can be reduced.

FIG. 1 is a graph showing a relationship between the crystal grain size and the irradiation defect concentration.

As shown in this figure, the irradiation defect concentration is low when the crystal grain size is 5.0 µm or less. Therefore, an average crystal grain size is preferably 5.0 µm or less. Further, a value of 5.0 µm in average crystal grain size is also preferable from a viewpoint of increasing the strength by refining the crystal grain. A relationship between the crystal grain size and a mechanical strength is empirically established by a hall-petch relational expression, and a tensile strength becomes higher as the crystal grain becomes finer. It is said that an effect of increasing the strength becomes apparent when iron is refined down to about 5 µm. From these two viewpoints, the average crystal grain size of the stainless steel according to the present embodiment is set to 5.0 µm or less.

It is known that columnar crystals are formed in the rapidly solidified structure. Since the columnar crystals have problems that a strength property changes in a minor axis direction and a major axis direction and that fracture along the major axis direction easily grows, a proportion of the columnar crystals is preferably lower. When a case where a crack grows along the major axis direction of the columnar crystals is considered, it is considered that the columnar crystals are not continuous with each other, and equiaxed crystals intervene between the columnar crystals to discontinuously connect the columnar crystals, so that the growth of the crack can be prevented. From a viewpoint of grain boundary characteristics control and the like, when a proportion of grain boundaries having a specific characteristic exceeds 80%, continuity of the grain boundaries having the remaining 20% characteristics is lost.

From this viewpoint, it is considered that continuity of the columnar crystals can be lost by setting the proportion of the columnar crystals to 20% or less. For the above reason, an area proportion of the columnar crystals is 20% or less. The area proportion is calculated based on a value of only the parent phase, not including the precipitation phase or the like.

A crystal grain size of the columnar crystals is defined by a length in the major axis direction. In order to prevent the average crystal grain size of the whole from increasing, the crystal grain size of the columnar crystals is preferably as small as possible, and set to be smaller than an average crystal grain size of a commercial available austenitic stainless steel and set to 20 µm or less.

The stainless steel of the present embodiment is composed of 20% or less columnar crystals and the remaining 80% or more equiaxed crystals. The precipitation phase is not included in the calculation of the proportion. The equiaxed crystal is made to be 5.0 µm or less for the above reason in order to refine the average crystal grain size of the whole and to improve irradiation resistance and a mechanical property.

The additional elements (Zr, Ti, Ta, Hf) are added for the purpose of forming a precipitate that is a pinning site preventing coarsening of the crystal grain. These additional elements combine with impurities such as oxygen (O), carbon (C), and nitrogen (N) in the material to form the precipitation phase. The precipitation phase acts as a nucleus of the crystal during melting and solidification, and contributes to the refinement of the crystal grain. The finer the precipitation phase, the stronger the force for preventing the coarsening of the crystal grain, and the precipitation phase is preferably fine also as a nucleation site. According to Orowan and Ansell models, the finer and denser the precipitate is the better.

From a viewpoint of preventing the coarsening of the crystal grain, it is considered that a pinning effect of the crystal grain is exhibited at 0.01 µm or less. As a nucleation site for the refinement of the crystal grain, it is considered that even about 1.0 µm is sufficiently effective. It is considered that 0.01 µm or less is necessary to exhibit both effects. It is preferable that a number density of the precipitation phase is higher, but if the precipitation phase is precipitated excessively, a decrease in a base metal region between the precipitation phases causes a decrease in toughness.

In view of the above, in the present embodiment, an average grain size of the precipitate is set to 20 nm or less, the maximum is set to 100 nm, and the number density is dispersed at $1.0 \times 10^{21}$ to $1.0 \times 10^{24}/m^3$.

The precipitation phase is precipitated in a circular shape, an elliptical shape, or a rectangular shape. The elliptical or rectangular precipitation phase has a major axis direction and a minor axis direction, but if an aspect ratio, which is a ratio thereof, becomes large, the large aspect ratio causes material anisotropy, which is not preferable. Therefore, the aspect ratio of the elliptical or rectangular precipitation phase is set to less than 1.5.

It is ideal that an amount of the additional elements is in a state of being added just enough when the additional elements combine with the impurities in the parent phase. Here, Zr will be described as an example of the additional elements.

Zr added in excess may promote generation of intermetallic compounds and deteriorate the mechanical property. On the other hand, even if Zr is added just enough, some Zr is in a solid solution state in the parent phase. At this time, Zr which is an oversize element compared to Fe in the mother phase, acts as a trap site for irradiation defects, and has effects of promoting recombination of the irradiation defects and preventing irradiation-induced segregation, so that Cr deficiency due to the irradiation-induced segregation can be prevented and the irradiation resistance and the corrosion resistance can be improved. These effects are also possible for oversize elements such as Ti, Ta, Hf, and since Ti, Ta, and Hf easily form a precipitation phase, Ti, Ta, and Hf may be used as a substitute for Zr.

The parent phase of the present embodiment is preferably an austenite single phase, but the ferrite phase generated in the rapid solidification process remains for the purpose of improving the mechanical property as necessary. If the ferrite phase remains excessively, the ferrite phase becomes a factor that reduces the toughness and a factor that reduces the corrosion resistance, which is not preferable. In the present embodiment, an upper limit of the ferrite phase is 20%. A lower limit of the ferrite phase is 0%, and in this case, the parent phase is the austenite single phase. That is, the parent phase may be a mixed phase of the austenite phase and the ferrite phase.

In order to introduce a ferrite phase as necessary, it is preferable to transform primary ferrite into austenite, and it is necessary to make chemical composition within the following range.

$$1.48 \leq \frac{[wt\% \text{ Cr}] + 1.5 \times [wt\% \text{ Si}] + [wt\% \text{ Mo}] + 0.5 \times [wt\% \text{ Zr}] + 2.0 \times [wt\% \text{ Ti}]}{[wt\% \text{ Ni}] + 0.5 \times [wt\% \text{ Mo}] + 30 \times [wt\% \text{ C}] + 30 \times [wt\% \text{ N} - 0.06]} \leq 1.95$$

In the ferrite phase generated by rapid melting and rapid solidification, it is necessary to adjust a ferrite amount according to desired properties from the viewpoint of the above toughness and corrosion resistance. It is general to use a heat treatment as a method. It is widely known that, in a temperature range of 450° C. to 850° C., δ ferrite phase-separates into an o phase while austenizing. Since the o phase is generally treated as an embrittlement phase (harmful phase), the heat treatment in the temperature range is not preferable. In order to reduce the δ ferrite, it is preferable to perform the heat treatment at a temperature of 950° C. or more. At this time, if the temperature is kept in the range of 450° C. to 850° C. for a long time during a cooling process, the residual ferrite which is not austenitized may phase-separate into the o phase. Therefore, it is preferable to cool by a method of air cooling, preferably water cooling or oil cooling, such that the temperature range is quickly passed.

EXAMPLE

The following is an example in which it is confirmed that the material of the present embodiment exhibits good properties.

First, Table 1 shows chemical composition (weight ratio, %) of a material produced this time.

This time, a metal powder additive manufacturing method was used as a method for rapid melting and rapid solidification. In this method, an alloy powder was spread in a device with a thickness of 50 μm or less per layer, and a laser was emitted to the alloy powder to locally rapidly melt and rapidly solidify the alloy powder. After scanning a predetermined range for one layer, a stage on which the powder was spread was lowered, the alloy powder was spread again, and the laser was emitted to rapidly melt and rapidly solidify the alloy powder. This process was repeated to obtain a bulk sample. For the prototype, M280 manufactured by EOS was used. Further, although not shown in the table as a comparative material, a commercial available JIS standard material of SUS316L was used.

TABLE 1

| ID | C | Ni | Mn | Cr | Si | O | N | Zr | Ta | Mo | Ti | Fe |
|---|---|---|---|---|---|---|---|---|---|---|---|---|
| No. 1 | 0.011 | 11.4 | 0.1 | 19.9 | 0.8 | 0.018 | 0.04 | 1.22 | — | 0.02 | — | Bal. |
| No. 2 | 0.013 | 12.0 | 0.1 | 20.0 | 0.8 | 0.019 | 0.04 | 1.00 | — | 0.02 | — | Bal. |
| No. 3 | 0.013 | 11.8 | 0.1 | 19.8 | 0.8 | 0.019 | 0.04 | 0.77 | — | 0.01 | — | Bal. |
| No. 4 | 0.012 | 11.8 | 0.1 | 19.8 | 0.8 | 0.017 | 0.04 | 0.70 | — | 0.01 | — | Bal. |
| No. 5 | 0.016 | 11.5 | 0.1 | 19.2 | 0.8 | 0.019 | 0.04 | 0.70 | — | 0.02 | — | Bal. |
| No. 6 | 0.015 | 11.7 | 0.1 | 19.1 | 0.8 | 0.020 | 0.04 | — | 1.00 | 2.24 | — | Bal. |
| No. 7 | 0.011 | 11.7 | 0.1 | 18.8 | 0.8 | 0.021 | 0.04 | — | — | 0.01 | 1.00 | Bal. |

FIG. 2 is a graph showing a relationship between a heat input amount and a ferrite proportion during manufacturing. No. 1 powder is used in the described data.

From this figure, it can be seen that the ferrite proportion decreases as the heat input amount increases.

FIG. 3 is a graph showing a relationship between the heat input amount and a filling rate.

As shown in this figure, the filling rate increases as the heat input amount increases, and is a substantially constant value when the heat input amount is 0.3 or more (J/mm).

In FIG. 2, the ferrite proportion was 20% or less, and in FIG. 3, 0.35 (J/mm) was selected and prototyped as the heat input amount that brings the filling rate close to 100%.

FIG. 4 shows a hardness measurement result of each test piece.

As shown in this figure, No. 1 test piece has the highest hardness. When No. 1 to 5 test pieces are compared, the hardness tends to decrease as a content of Zr decreases. It is considered that this is because an amount of a precipitation phase is reduced due to a decrease of an additional element. Further, the hardness of the test pieces added with Ta and Ti (No. 6 and No. 7) is lower than that of the test piece added with the same amount of Zr. All test pieces show higher hardness than that of the commercial available material SUS316L, and the stainless steel according to the present embodiment is shown to have excellent hardness.

FIG. 5 shows a tensile test result of each test piece.

As shown in this figure, a tensile strength has a tendency similar to that of the hardness, No. 1 test piece has the highest tensile strength, and is the test piece having the highest addition amount of Zr. For No. 2 to No. 5 test pieces, the addition amount of Zr decreases in order, and the tensile strength tends to decrease as the addition amount of Zr decreases. All the test pieces show higher values than that of the commercial available material SUS316L, and the stainless steel according to the present embodiment is also shown to have an excellent mechanical property.

FIG. 6 shows an EBSD observation result of No. 3 test piece as a representative structure of the stainless steel according to the present embodiment. (a) shows the whole structure. (b) shows a result of extracting only an austenite phase from the whole structure. (c) shows a result of extracting only a ferrite phase from the whole structure. Here, the EBSD means electron backscatter diffraction.

FIG. 7 is a graph showing a crystal grain size distribution of No. 3 test piece.

Table 2 shows a result obtained by obtaining images of the structures similar to (a), (b) and (c) shown in FIG. 6 and calculating an average crystal grain size based on the images. Average crystal grain sizes of a whole structure, an equiaxed crystal, and a columnar crystal of each test piece are shown. All the average crystal grain sizes generally are within the same range.

TABLE 2

| ID | Average crystal grain size of whole [μm] | Average crystal grain size of equiaxed crystal [μm] | Average crystal grain size of columnar crystal [μm] | Ferrite phase rate [%] |
| --- | --- | --- | --- | --- |
| No. 1 | 3.52 | 0.98 | 15.6 | 15.4 |
| No. 2 | 3.41 | 1.02 | 14.3 | 12.4 |
| No. 3 | 3.12 | 1.11 | 12.5 | 13.5 |
| No. 4 | 3.68 | 0.97 | 16.7 | 13.2 |
| No. 5 | 3.25 | 1.05 | 15.2 | 14.4 |
| No. 6 | 3.99 | 1.22 | 13.4 | 13.0 |
| No. 7 | 4.01 | 1.19 | 17.9 | 12.3 |

No. 3 test piece was heat-treated at a predetermined temperature for 30 minutes and cooled with water, and then the hardness of the test piece was examined.

FIG. 8 is a graph showing a relationship between a heat treatment temperature and a ferrite amount of No. 3 test piece.

As shown in this figure, the ferrite amount is high at a heat treatment temperature of 450° C. or less, but the ferrite amount decreases when the heat treatment temperature exceeds 500° C., and significantly decreases at 650° C. or more.

Table 3 shows a result obtained by performing a hardness test on primary crystal δ ferrite after the heat treatment at each test temperature. Hardness of the primary crystal δ ferrite showed a tendency to be higher than hardness of the whole test piece before the heat treatment (about 270). The hardness of the primary crystal δ ferrite increases with the increase of the heat treatment temperature, and decreases at 950° C.

Up to the heat treatment temperature of 850° C., the hardness of the whole test piece decreases due to an influence of the austenite phase. On the other hand, since the δ ferrite is decomposed into an σ phase, the hardness of the primary crystal δ ferrite portion is increased.

At the heat treatment temperature of 950° C., the hardness of the primary crystal δ ferrite phase is equal to the hardness of the whole test piece because the austenite phase is transformed.

TABLE 3

| Heat treatment temperature [° C.] | Hardness of whole | Hardness of primary crystal δ ferrite |
| --- | --- | --- |
| Not performed | 272 | 305 |
| 450 | 275 | 307 |
| 550 | 272 | 320 |
| 650 | 275 | 325 |
| 750 | 265 | 340 |
| 850 | 250 | 341 |
| 950 | 232 | 239 |

FIG. 9 is a graph showing relationships between the heat treatment temperatures and the average crystal grain sizes of No. 3 test piece and the commercial available material.

In the commercial available material SUS316L, although not shown, there was a problem that the crystal grain was coarsened by a heat treatment.

As shown in this figure, in No. 3 test piece, the average crystal grain size does not change even after the heat treatment, and the problem in the related art can be solved.

FIG. 10 shows a structure comparison of No. 3 test piece before and after the heat treatment. Heat treatment conditions are a temperature of 1000° C. and a time of 0.5 hours.

From this figure, it can be seen that No. 3 stainless steel shows almost no structural change before and after the heat treatment.

FIG. 11 shows a TEM observation result of No. 3 test piece.

From this figure, it can be seen that the largest precipitation phase is about 100 nm, and the majority is a fine precipitation phase of 50 nm or less. Here, the TEM refers to a transmission electron microscope.

FIG. 12 shows a TEM observation result of a replica sample extracted from No. 3 test piece.

Table 4 shows a grain size and a number density of a precipitation phase of each test piece. The size of the precipitation phase tends to increase as the addition amount of Zr increases, and the number density tends to decrease. Further, a result is obtained that compared with the case where Zr is added, the grain size is smaller and the number density is higher when Ta or Ti is added.

TABLE 4

| ID | Grain size [nm] | Number density [X $10^{22}$ m$^{-3}$] |
| --- | --- | --- |
| No. 1 | 19 | 3.1 |
| No. 2 | 18 | 4.1 |
| No. 3 | 19 | 4.9 |
| No. 4 | 15 | 5.1 |
| No. 5 | 16 | 5.2 |
| No. 6 | 14 | 6.0 |
| No. 7 | 13 | 5.5 |

Table 5 shows results of a general corrosion test of the test pieces according to the present embodiment and the comparative material. The test was performed by immersing in a light water reactor environment (temperature: 288° C., pressure: 8.0 MPa, dissolved oxygen: 8 ppm) for 2000 hours.

A weight increase ratio shown in this table is a relative value of an elution amount calculated based on measured weight of a sample with oxide generated on a surface of the sample after the corrosion test being removed, to a value of the commercial available material SUS316L being set to 1. It is shown that for all the test pieces, a weight change in an immersion test is smaller than that of the SUS316L, and the corrosion resistance of the test pieces is high.

TABLE 5

| ID | Weight increase ratio No. X/316L |
|---|---|
| No. 1 | 0.88 |
| No. 2 | 0.84 |
| No. 3 | 0.87 |
| No. 4 | 0.85 |
| No. 5 | 0.88 |
| No. 6 | 0.87 |
| No. 7 | 0.87 |

Sensitivity to stress corrosion cracking in a high-temperature high-pressure water environment was evaluated. The test adopted a CBB test. Here, CBB test refers to the Creviced Bent Beam test. The test environment was a temperature of 288° C., a pressure of 8.0 MPa, and a dissolved oxygen concentration of 8.0 ppm, and an immersion test was performed for 2000 hours. The number of testers was 8 per sample. A surface condition of the sample was processed by a shaper. A final heat treatment was a sensitization heat treatment which was performed by maintaining at 620° C. for 24 hours and then air cooling. After the test was completed, a crack length generated on the surface of the test piece was measured. A crack having a depth of 40 μm or more was taken as a crack, and the evaluation was performed in terms of the number of cracks and the maximum crack depth.

Table 6 shows the result.

The number of generated cracks was smaller in No. 1 and No. 3 to No. 5 test pieces than in the comparative material 316L. From this, it is considered that No. 1 and No. 3 to No. 5 test pieces have low SCC generation sensitivity. On the other hand, regarding the maximum crack depth, the material in the related art (comparative material 316L) is shallower. It is considered that No. 1 and No. 3 to No. 5 test pieces have an excellent strength property, and therefore, when a crack occurs, a stress generated at a crack tip is high and the crack grows rapidly. From a viewpoint of preventing the generation of the SCC, it can be said that No. 1 and No. 3 to No. 5 test pieces are excellent.

TABLE 6

| ID | Number of generated cracks | Maximum crack depth [μm] |
|---|---|---|
| No. 1 | 6/8 | 202 |
| No. 3 | 5/8 | 181 |
| No. 4 | 7/8 | 75 |
| No. 5 | 6/8 | 182 |
| 316L | 8/8 | 54 |

Table 7 shows a result obtained by performing an ion irradiation test on the test pieces according to the present embodiment and the comparative material, and measuring an amount of a change in hardness due to the irradiation. Irradiation test conditions were irradiation ion: $Fe^{3+}$ ion, energy: 6.4 MeV, and temperature: 300° C., and a damage amount was 1.0 dpa. The hardness was measured using a Nano Indenter G200 manufactured by Agilent Technologies. The irradiation test was performed on No. 2 test piece, No. 3 test piece, and the SUS316L as the comparative material.

As shown in this table, irradiation curing amounts of No. 2 test piece and No. 3 test piece are values smaller than that of the comparative material. It is considered that this is because a large amount of irradiation defect sink sites are introduced due to the refinement of the crystal grain. From this, it can be said that No. 2 test piece and No. 3 test piece are more excellent than the comparative material from a viewpoint of irradiation resistance.

TABLE 7

| No. | Irradiation curing amount ΔH [GPa] |
|---|---|
| 2 | 0.5 |
| 3 | 0.3 |
| 316L | 1.3 |

The invention is a material excellent in the irradiation resistance and the SCC resistance, which is a problem in a reactor environment, and can be applied to various complicated structures by using the metal powder additive manufacturing method. As an example, the material can be applied to reactor internal structures such as reactor control rods, core shrouds, and upper lattice plates that use austenitic stainless steels. Further, by forming ferrite, the material can be applied to components using duplex stainless steels such as fuel support fittings and lower tie plates.

The invention claimed is:

1. An austenitic stainless steel, comprising:
    a mixed grain structure composed of a columnar crystal having an average crystal grain size of 20 μm or less and an equiaxed crystal having an average crystal grain size of 5.0 μm or less, wherein
    an area proportion of the columnar crystal in the mixed grain structure is 20% or more,
    an average crystal grain size of an entirety of the mixed grain structure is 5.0 μm or less,
    the austenitic stainless steel contains, by weight ratio, Cr: 16 to 26%, Ni: 3.5 to 26%, Si: 0.1 to 1.0%, Mo: 0.01 to 7.0%, Mn: 0.1 to 2.5%, C: 0.01 to 0.08%, O: 0.01 to 0.5%, N: 0.01 to 0.25%, and further contains Zr: 0.1 to 2.8%, and additional elements, and the balance is Fe and inevitable impurities, and
    the additional elements contain one or more of Ti, and Ta.

2. The austenitic stainless steel according to claim 1, wherein
    a parent phase is an austenite single phase.

3. The austenitic stainless steel according to claim 1, wherein
    a parent phase is a mixed phase of an austenite phase and a ferrite phase, and
    a proportion of the ferrite phase is 20% or less.

4. The austenitic stainless steel according to claim 1, wherein
    the stainless steel contains, by weight ratio,
    when the austenitic stainless steel contains Zr, Zr: 0.1 to 2.8%,
    when the austenitic stainless steel contains Ti, Ti: 0.1 to 2.8%, when the austenitic stainless steel contains Ta, Ta: 0.2 to 5.0%, and when the austenitic stainless steel contains Hf, Hf: 0.1 to 4.7%.

5. The austenitic stainless steel according to claim 1, wherein the austenitic stainless steel satisfies the following expression:

$$1.48 \leq \frac{[wt\ \%\ Cr] + 1.5 \times [wt\ \%\ Si] + [wt\ \%\ Mo] + 0.5 \times [wt\ \%\ Zr] + 2.0 \times [wt\ \%\ Ti]}{[wt\ \%\ Ni] + 0.5 \times [wt\ \%\ Mo] + 30 \times [wt\ \%\ C] + 30 \times [wt\ \%\ N - 0.06]} \leq 1.95.$$

6. The austenitic stainless steel according to claim 1, further comprising:

a precipitation phase containing one or more of Zr, Ti, Ta, and Hf as a main component, wherein an average grain size of the precipitation phase is 20 nm or less, and a number density of the precipitation phase is $1.0 \times 10^{21}$ m$^{-3}$ or more.

7. The austenitic stainless steel according to claim 6, wherein the precipitation phase has an elliptical shape or a rectangular shape with an aspect ratio of less than 1.5.

8. A reactor internal structure, comprising:

a component made of the austenitic stainless steel according to claim 1.

* * * * *